June 27, 1939.  A. R. BOND  2,163,772
LIQUID DISPENSING APPARATUS
Filed April 28, 1937
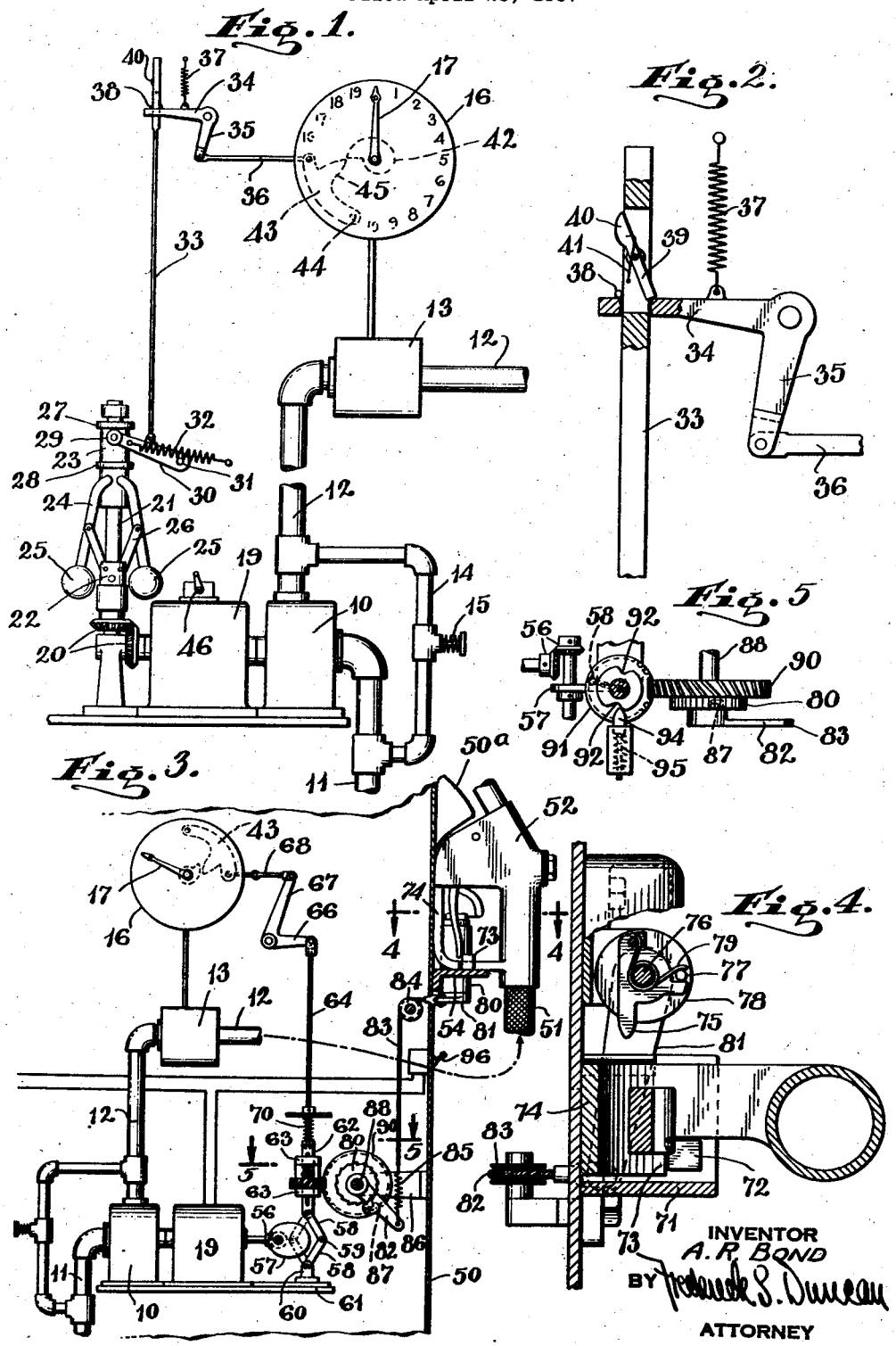
INVENTOR
A. R. BOND
BY [signature]
ATTORNEY Patented June 27, 1939

2,163,772

UNITED STATES PATENT OFFICE 2,163,772

LIQUID DISPENSING APPARATUS

Alexander R. Bond, Plainfield, N. J., assignor to Keystone Controls, Inc., New York, N. Y., a corporation of New York Application April 28, 1937, Serial No. 139,358

18 Claims. (Cl. 221—95)

The present invention relates to liquid dispensing apparatus of the type in which the liquid is metered as it is dispensed and an object of the invention is to provide novel means for automatically resetting the meter indicator to zero position before each delivery so as to insure full measure of the liquid delivered.

The invention relates more particularly to apparatus employing motor driven means for delivering the liquid under pressure and an object of the invention is to provide means controlled by power of the motor for resetting the meter indicator.

Another object of the invention is to provide power driven means which will insure resetting of the meter indicator to zero position at the beginning of each dispensing operation.

The present invention is more particularly adapted for use in delivery pumps of the type commonly employed at service stations, garages, etc., for dispensing gasoline. Such pumps are commonly driven by electric motors and in one embodiment of my invention I employ centrifugal means driven by the motor to control resetting of the meter indicator or at least to insure that the meter has been reset every time the motor is started.

My invention provides further for preventing operation of the resetting means after the meter has been reset until after the motor speed has dropped to practically zero.

In another form of my invention I employ means directly driven by power of the pump motor for positively resetting the meter.

In metered delivery pumps of the type referred to above a flexible hose is employed for delivering the gasoline to the tanks of automobiles, such hose terminating in a dispensing nozzle. After each delivery the nozzle is placed on a support at one side of the pump stand and in one form of my invention I employ means operated by placing the nozzle on the support whereby the nozzle cannot be removed and put into service without conditioning the resetting mechanism to be operated by the motor.

Other objects and advantages of my invention will appear in the following description of two embodiments thereof and thereafter the novelty and scope of the invention will be pointed out in the claims.

In the accompanying drawing:

Figure 1 is a view in side elevation of a dispensing apparatus embodying my invention;

Fig. 2 is a detail view partly in section of a pawl mechanism employed in said apparatus;

Fig. 3 is a view in side elevation of another embodiment of my invention installed in a pump stand, the casing of the pump stand being shown fragmentally and in section;

Fig. 4 is a view in section taken substantially on line 4—4 of Fig. 3; and

Fig. 5 is a view in section taken substantially on line 5—5 of Fig. 3.

The apparatus shown in Fig. 1 comprises a pump 10 which is adapted to draw fluid through an intake pipe 11 from a suitable source, not shown, and deliver said fluid into an outlet pipe 12 which connects with a meter 13. From the meter the fluid is carried by a continuation of the pipe 12 to the dispensing point. The usual by-pass line 14 is provided around the pump 10 and has a pressure control valve 15.

The meter 13 is provided with indicating mechanism comprising a dial 16 and an indicator hand 17. Suitable mechanism is also provided for resetting the hand to initial or zero position when desired.

The pump 10 is driven by an electric motor 19. In the drawing, this motor is shown as directly connected to the pump but it will be obvious that suitable gearing may be provided between the motor and pump, as is commonly done in actual practice. The motor shaft through miter gears 20 drives a governor shaft 21 on which is mounted a ball governor. The latter comprises a collar 22 which is fixed to the shaft 21 and a sleeve 23 which turns with but is slidable axially on the shaft 21. A pair of arms 24 are pivoted to the sleeve 23 and at their lower ends carry the balls or weights 25. The arms 24 are connected by pivoted links 26 to the collar 22. The parts are so arranged that when the motor is operated the pawls or weights 25 will be thrown outwardly by centrifugal force, pulling the sleeve 23 downwardly on the shaft 21.

The sleeve 23 is formed with spaced flanges 27 and 28 respectively, between which are located rollers 29 carried by a yoke arm 30 at opposite sides of the sleeve (only one of the rollers being shown in the drawing). The yoke arm 30 is pivoted at 31 and is urged by a spring 32 in either raised position with the rollers 29 bearing against flange 27 or in lowered position with the rollers bearing against flange 28. In normal position, when the motor is at rest, the roller 29 bears against the upper flange 27. However, when the motor is started and the sleeve is pulled downwardly the arm 30 will be swung down by engagement of rollers 29 with flange 27 and as soon as the yoke 30 has been swung past horizontal position the spring 32 will throw it the rest of the way down, bringing the roller 29 against flange 28. There is considerable space between the flanges 27 and 28, providing lost motion so that the speed of the motor may vary considerably without swinging the arm 30 upwardly past horizontal position.

A rod 33 is pivotally connected at its lower end to the arm 30 and at its upper end passes through an opening in one arm 34 of a bell-crank lever. The other arm 35 of this bell-crank is connected by a push rod 36 to the resetting mechanism of the meter. A spring 37 normally holds the bell-crank in raised position with its arm 34 bearing against a fixed stop 38. As shown more clearly in Fig. 2, the upper end of the rod 33 carries a pawl 39 which normally projects from the side of the rod so as to engage the arm 34. When the rod 33 is pulled downwardly it will depress the arm 34. However, the pawl 39 has an upward extension 40 which projects from the opposite side of the rod 33. This extension has a cam face which cooperates with the stop pin 38 to withdraw the pawl 39 from engagement with the arm 34 so that after the rod 33 has been pulled down to a predetermined extent it will release its hold on the arm 34 and permit the latter to spring up under pull of spring 37. A spring 41 tends to restore the pawl to the position shown in Fig. 2 when the rod 31 is again raised to clear the cam 40 from engagement with the pin 38.

The meter indicator mechanism may be provided with any well-known resetting device which may be operated by the thrust of rod 36. By way of illustration, I show a reset device comprising a spiral cam 42 fixed to turn with the hand 17. A reset lever 43 is pivoted at 44 and is connected at its outer end to the push rod 36. The reset lever bears a lug 45 of such shape that when the lever 43 is swung inwardly by the rod 36 this lug will cooperate with the cam 42 to restore the hand 17 to its initial or zero position.

Mounted on the motor 19 is a switch 46 controlling the motor circuit. This switch may be located at any other convenient place for starting and stopping the motor.

In use, when it is desired to dispense fluid, the switch 46 is closed to start the motor 19. This will cause the pump 10 to deliver fluid through the meter 13 and the indicating mechanism will show the quantity of fluid dispensed. However, at the very initial movement of the motor, the governor will be operated to pull the rod 33 downwardly, thereby resetting the meter to zero position. Such resetting will take place as soon as the yoke arm 30 has been drawn down past horizontal position, when the spring 32 will give the arm 30 a downward pull sufficient to actuate the reset mechanism. The extent of the resetting thrust of the rod 36 will depend upon the position of the cam surface 40 with respect to the stop 38, the parts being so arranged that when the reset lever 43 has been moved inwardly far enough to reset the hand 17 to zero position the pawl 39 will be withdrawn from engagement with the arm 34 and then spring 37 will retract the reset lever 43. Thereafter, the rod 33 may move up and down with variations of speed of the motor without in the least affecting the operation of the reset mechanism. Not until the motor has slowed down virtually to a stop will the flange 28 raise the yoke 30 past horizontal position or sufficiently for the spring 32 to snap the yoke upwardly. When this happens the pawl 39 snaps outwardly to a position in which it will engage the arm 34 of the bell-crank lever upon the next downward pull of rod 33. The yoke arm 30 thus serves as a trigger for the resetting mechanism, being held in cocked position by the spring 32 when the motor is idle, as shown in Fig. 1, and being actuated by the spring 32 to operate the reset lever when the governor depresses said trigger past horizontal position. When the motor stops or when its speed drops substantially to zero the trigger is cocked again under control of the governor which raises it past horizontal position, the spring 32 then serving to complete the cocking operation.

It will be observed, therefore, that I have provided means controlled by the motor for resetting the meter indicator to zero position, and such resetting takes place immediately after the motor starts up from a position of rest. Thus, the customer is sure that the meter indicator will always be properly reset before it will begin to register the delivery of fluid and since this resetting mechanism is out of control of the attendant there will be no chance of effecting a partial reset and thus defrauding the customer.

The construction shown in Fig. 3 differs from that shown in Fig. 1 mainly in the fact that although the resetting of the meter is controlled by the motor the speed of the motor is not a factor, but as soon as the motor starts to turn the meter indicator will be reset, regardless of whether the motor has been brought up to speed.

In Fig. 3, I have used the same reference numerals as in Fig. 1 for corresponding parts. In this construction, I employ mechanism controlled by a delivery nozzle for cocking the resetting mechanism or conditioning the parts for resetting the meter. The apparatus is shown as installed in a pump stand, the casing of the stand being shown fragmentally at 50. The pump 10 draws fluid through an intake pipe 11 and delivers it through outlet pipe 12 and meter 13 to an extension of the outlet pipe 12. Suitably connected to this extension 12, outside of the casing, is a hose 51. The connection of the hose to the pipe 12 is not shown in the drawing but such connection will be understood to follow common practice. The hose 51 terminates in a nozzle 52. A support 54 is provided on the casing 50 for the nozzle 52 when it is not in use.

The pump 10 is driven by a motor 19 either directly or through suitable gearing (not shown). The motor shaft drives through suitable gearing 56 an eccentric 57. This eccentric is adapted to engage a pair of toggle links 58 at their point of connection 59. The lower one of these toggle links is pivoted to a bracket 60, swiveled in a base 61. The upper toggle link 58 is pivoted to a shaft 62 which slides and turns in suitable bearings 63. A rod 64 has swivel connection at its lower end with the shaft 62 and at its upper end is connected to one arm 66 of a bell-crank, the other arm 67 of which is connected by a push-rod 68 to the resetting mechanism of the meter indicator. A spring 70 normally urges the rod downwardly, forcing the toggle links 58 out of alinement, as shown in Fig. 3.

The eccentric cam 57 will swing the toggle links from the position shown in broken lines in Fig. 3 to that shown in full lines and in so doing will give the rod 64 an upward thrust causing resetting of the meter indicator. However, the toggle links are returned from the full line position to the dotted line position without changing the relative angle between the links by rotating the shaft 62, and hence without imparting a thrust to the rod 64. Such rotation is controlled by withdrawing the nozzle 52 from its support 54.

As shown in Fig. 4, this support is provided with a side wall 71 and also with a lug 72 rising from the floor of the support and adapted to fit back of a shoulder 73 of a guard 74 formed on the nozzle. The casing 50 is also provided with a bulging portion 50a so that it is impossible to introduce the nozzle upon its support without moving it laterally to clear the lug 72. In doing this the nozzle guard is adapted to engage a projecting latch member 75 which is pivoted upon the upper end of a shaft 76. The latch member has an arm which normally bears against a pin 77 projecting from a head 78 formed upon the shaft 76. A spring 79 holds the arm against this stop 77 with the latch projecting into the path of the nozzle guard. Thus, when the nozzle is introduced and placed upon its support, the latch 75 is swung clockwise until it clears the nozzle guard 74. On withdrawing the nozzle valve from its support it again engages the latch 75, this time turning it counter-clockwise, and thereby rotating the head 78 and shaft 76. This shaft is supported in a suitable bearing 80 carried by the casing 50 and at its lower end is fitted with a crank arm 81. The free end of this arm is connected to a lever 82 by a cable 83 which extends through the casing 50 and over a pulley 84. A spring 85 is preferably inserted between the cable and this lever. The lever 82 is journalled in a bracket 86 and carries a spring-pressed pawl 87 which engages a ratchet wheel 88. Thus, when the nozzle is withdrawn from its support it pulls the arm 82 upwardly and thereby turns the ratchet wheel through a predetermined angle.

Fixed to move with the ratchet wheel 88 is a spiral gear 90 which meshes with a spiral pinion splined on the shaft 62. The pinion 91 has a hub formed with a pair of diametrically opposed flaring indentations 92. These indentations are on a line normal to the plane of the toggles 58. A plunger 94 is pressed by a spring 95 against the hub of the pinion 91 and is seated in one of the depressions 92 when the toggles are either in the full line position shown in Fig. 3, or, in the diametrically opposed position which they would occupy immediately before being sprung by the cam 57.

The operation of the apparatus is as follows: When the attendant withdraws the nozzle 52 from its support, the nozzle turns the shaft 76 counter-clockwise, as viewed in Fig. 4, and thereby swivels the toggle mechanism from the full line position in Fig. 3 to the dotted line position. If the cam 57 should chance to be in a position 180 degrees removed from that shown in Fig. 3, the toggles would be swung through 180 degrees and would be in position to be engaged by the cam upon the next operation thereof. In most cases, however, the cam would stop in a position in which it would block complete return of the toggles to position in alinement with the cam. In other words, the toggle would occupy the position indicated by broken lines, in Fig. 5, in which position they are pressed against the side of the cam by the pressure of the plunger 94 against a side of one of the indentations 92. However, as soon as the motor is started, which may be done by operating a switch button 96 conveniently located near the nozzle support 54, the cam will be turned and the toggles will be swung into the plane of the cam under the urge of spring 95 as soon as the cam is cleared. Thereafter, continued turning of the cam will swing the two toggle arms into vertical alinement, giving an upward thrust to the rod 64 and thereby operating the reset mechanism. As soon as the toggle levers pass the position of alinement with the shaft 62 they will be swung clear of the cam to the position shown in full lines in Fig. 3 by the pressure of spring 70.

It will be understood that the spring-pressed plunger 94 holds the toggle links against swiveling as they are operated by the cam but the spring pressure on the plunger is not sufficient to prevent swiveling of the toggle links to condition them for the next operation. It will be noted that the resetting mechanism is given a single reciprocation by operation the cam 57 on the toggle links 58 and the latter are immediately moved out of reach of the cam by the spring 70 so that the cam may continue to turn without doing any further work. Only after the nozzle has been replaced upon its support and then withdrawn from the support will the toggles be conditioned for the next actuation of the resetting mechanism.

Since there is no place to put the nozzle except on the support 54 the attendant must necessarily place the nozzle on the said support after he has finished a delivery and hence he must necessarily condition the resetting mechanism for operation whenever he takes the nozzle off its support. If he wishes to reset the meter immediately after a sale has been completed he may do so by pulling the nozzle off the support while the motor is still running. In any case, the mechanism will be operated automatically whenever the nozzle is removed from its support if the motor is running at the time, or, as soon thereafter as the motor is started and customers are thus assured that the meter will be properly reset at the start of each delivery.

While I have described two embodiments of my invention it will be understood that this will be taken as illustrative and not limitative and that I reserve the right to make various changes in form, construction, arrangement and mode of operation as may fall within the spirit and scope of the following claims.

I claim:

1. In an apparatus of the character described, a conduit, power driven means for supplying the conduit with fluid, a meter connected to the conduit and having an indicator for registering the flow of said fluid through the conduit, means for starting and stopping the power means, a centrifugal governor driven by the power means, and means controlled by the governor for resetting the indicator to zero position when the speed of the power means exceeds predetermined amount.

2. In an apparatus of the character described, a conduit, power driven means for inducing a flow in said conduit, a meter connected to the conduit and having an indicator for registering the flow through the conduit, means for starting and stopping the power means, a centrifugal governor driven by the power means, resetting mechanism controlled by the governor for resetting the indicator to zero position when the speed of the power means exceeds a predetermined amount, and means for reconditioning the resetting mechanism for operation only after said speed drops substantially to zero.

3. In an apparatus of the character described, a conduit, power driven means for inducing a flow in said conduit, a meter connected to the conduit and having an indicator for registering the flow through the conduit, means for starting and stopping the power means, a centrifugal device driven by the power means, resetting mechanism controlled by the centrifugal device for resetting the indicator to zero position when the speed of the power means exceeds a predetermined amount, and means controlled by said device for reconditioning the resetting mechanism for operation only after said speed drops substantially to zero.

4. In an apparatus of the character described, a conduit, power driven means for supplying the conduit with fluid, a meter connected to the conduit and having an indicator for registering the flow of said fluid through the conduit, means for resetting the indicator to zero position, means for starting and stopping the power means, a centrifugal device driven by the power means, and means actuated by the centrifugal device at one speed of the power means for initiating operation of the resetting means and at another speed for conditioning the resetting means for operation when the power means again reaches the first mentioned speed.

5. In an apparatus of the character described, a conduit, power driven means for supplying the conduit with fluid, a meter connected to the conduit and provided with an indicator for registering the flow of said fluid through the conduit, means for starting and stopping the power means, and mechanism controlled by the power means for resetting said indicator to zero position, said mechanism comprising a trigger adapted to be tripped by the power means when the speed of said power means exceeds a predetermined amount so as to effect resetting of the indicator, and means for recocking the trigger when said speed drops below a predetermined amount.

6. In an apparatus of the character described, a conduit, power driven means for supplying the conduit with fluid, a meter connected to the conduit and provided with an indicator for registering the flow of said fluid through the conduit, means for resetting the indicator to zero position, and a cam driven by the power means for operating the resetting means.

7. In an apparatus of the character described, a conduit, power driven means for supplying the conduit with fluid, a meter connected to the conduit and provided with an indicator for registering the flow of said fluid through the conduit, means for resetting the indicator to zero position, and a cam driven by the power means for operating the resetting means, said resetting means being constructed and arranged to withdraw from operative relation with the cam at each resetting operation, and manual means for restoring the resetting means to operative relation with the cam.

8. In an apparatus of the character described, a conduit including a flexible hose terminating in a dispensing nozzle, power driven means for supplying the conduit with fluid to be dispensed, a meter connected to the conduit and provided with an indicator for registering the flow of said fluid through the conduit, means for resetting the indicator to zero position, mechanism controlled by the power means for operating the resetting means, a support for the nozzle when not in use, said mechanism being disconnected from the power means at each resetting operation, and means actuated by the nozzle as it is removed from the support for operatively connecting said mechanism with said power means.

9. In an apparatus of the character described, a conduit including a flexible hose terminating in a dispensing nozzle, power driven means for supplying the conduit with fluid, a meter connected to the conduit and provided with an indicator for registering the flow of said fluid through the conduit, resetting means for resetting the indicator to zero position, and a cam driven by the power means for operating the resetting means, said resetting means being constructed and arranged to withdraw from operative relation to the cam upon each operation thereof, and means associated with the nozzle for restoring the resetting means to operative relation with the cam.

10. In an apparatus of the character described, a conduit including a flexible hose terminating in a dispensing nozzle, power driven means for supplying the conduit with fluid to be dispensed, a meter connected to the conduit and provided with an indicator for registering the flow of said fluid through the conduit, mechanism operated by the power means for resetting the indicator to zero position, said mechanism being constructed and arranged to withdraw from operative relation with the power means at each resetting operation, a support for the nozzle when not in use, and means for operatively connecting said mechanism with said power means, the latter means including a part engaging the nozzle when the latter is on the support whereby operative connection of said mechanism and said power means must be established before the nozzle can be removed from the support.

11. In an apparatus of the character described, a conduit, power driven means for supplying the conduit with fluid, a meter connected to the conduit and provided with an indicator for registering the flow of said fluid through the conduit, means for resetting the indicator to zero position, a pair of interconnected toggle links, an abutment at the outer end of one of the links, an operative connection from the outer end of the other link to the resetting means, a spring normally holding the links in mutually angled position, a disk cam driven by the power means and adapted to swing the toggle links to and past mutual alinement and thereby operating the resetting means, and means for swiveling the toggle links to restore them to operative relation with the cam without swinging them into mutual alinement.

12. In an apparatus of the character described, a conduit, power driven means for supplying the conduit with fluid, a meter connected to the conduit and provided with an indicator for registering the flow of said fluid through the conduit, means for resetting the indicator to zero position, a pair of interconnected toggle links, an abutment at the outer end of one of the links, an operative connection from the outer end of the other link to the resetting means, a spring normally holding the links in mutually angled position, a disk cam driven by the power means and adapted to swing the toggle links to and past mutual alinement and thereby operating the resetting means, means for swiveling the toggle links to restore them to operative relation with the cam without swinging them into mutual alinement, and a spring urging the links into alinement with the cam, the latter spring preventing the links from swiveling while being engaged by the cam.

13. In an apparatus of the class described, a conduit, power operated means for inducing flow through the conduit, a flow registering meter associated with the conduit, a zeroizing mechanism for said meter, a trigger mechanism restraining actuation of the zeroizing mechanism and means for releasing the trigger upon starting of the power means.

14. In an apparatus of the class described, a conduit, power operated means for inducing flow through the conduit, a flow registering meter associated with the conduit, a zeroizing mechanism for said meter, a trigger mechanism restraining actuation of the zeroizing mechanism, means for releasing the trigger upon starting of the power means, and means for recocking the trigger substantially concurrently with the stoppage of the power means.

15. In an apparatus of the class described, a conduit, power operated means for inducing flow through the conduit, a flow registering meter associated with the conduit, a zeroizing mechanism for said meter, a trigger mechanism restraining actuation of the zeroizing mechanism, means for releasing the trigger upon starting of the power means, means for recocking the trigger substantially concurrently with the stoppage of the power means, and spring means for actuating the zeroizing mechanism and in which energy is stored as an incident of cocking the trigger.

16. In a fluid dispensing apparatus, the combination with a conduit, movable means for inducing a flow of fluid through said conduit, means for registering the amount of fluid flowing through said conduit, and means for resetting said registering means; of means responsive to an acceleration in the speed of movement of said flow inducing means for effecting a resetting operation of said resetting means.

17. In a fluid dispensing apparatus, the combination with a conduit, movable means for inducing a flow of fluid through said conduit, means for registering the amount of fluid flowing through said conduit and means for resetting said registering means; of means responsive to a deceleration in the speed of movement of said flow inducing means for reconditioning said resetting means.

18. In a fluid dispensing apparatus, the combination with a conduit, movable means for inducing a flow of fluid through said conduit, means for registering the amount of fluid flowing through said conduit and means for resetting said registering means; of means responsive to an acceleration in the speed of movement of said flow inducing means for effecting a resetting operation of said resetting means and responsive to a deceleration in the speed of movement of said flow inducing means for reconditioning said resetting means.

ALEXANDER R. BOND.